(12) United States Patent
Norquist

(10) Patent No.: US 9,355,431 B1
(45) Date of Patent: May 31, 2016

(54) IMAGE CORRECTION FOR PHYSICAL PROJECTION-SURFACE IRREGULARITIES

(71) Applicant: Skeets Jonathan Norquist, Duvall, WA (US)

(72) Inventor: Skeets Jonathan Norquist, Duvall, WA (US)

(73) Assignee: Amazon Technologies, Inc., Seattle, WA (US)

( * ) Notice: Subject to any disclaimer, the term of this patent is extended or adjusted under 35 U.S.C. 154(b) by 223 days.

(21) Appl. No.: 13/624,713

(22) Filed: Sep. 21, 2012

(51) Int. Cl.
*G06K 9/00* (2006.01)
*G06T 3/00* (2006.01)

(52) U.S. Cl.
CPC ............... *G06T 3/005* (2013.01); *G06T 3/0043* (2013.01)

(58) Field of Classification Search
None
See application file for complete search history.

(56) References Cited

U.S. PATENT DOCUMENTS

| 6,753,907 B1* | 6/2004 | Sukthankar et al. ....... 348/222.1 |
| 2012/0223885 A1 | 9/2012 | Perez |
| 2013/0077059 A1* | 3/2013 | Marti ................... H04N 9/3194 353/69 |
| 2014/0168524 A1* | 6/2014 | Nakade et al. ................ 348/734 |

FOREIGN PATENT DOCUMENTS

WO   WO2011088053   7/2011

OTHER PUBLICATIONS

Pinhanez, Claudio, et al. "Ubiquitous interactive graphics." In IBM Research Report RC22495. 2002.*
Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Nirav G Patel
(74) *Attorney, Agent, or Firm* — Lee & Hayes, PLLC

(57) ABSTRACT

A source image to be projected onto a projection surface is transformed based on a three-dimensional representation of the projection surface to create a modified source image. When the modified source image is projected onto the projection surface, a resulting display image is less distorted as compared to the original source image than a resulting display image would be if the original source image were projected onto the projection surface.

16 Claims, 18 Drawing Sheets

IMAGE CORRECTION FOR PHYSICAL PROJECTION-SURFACE IRREGULARITIES

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth. To enable such augmented reality environments, however, there is a continuing need for improved projection systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein are techniques to account for surface characteristics when projecting images within the environment. Illustrative implementations are described below in which a color of a projection surface is sampled and used to modify a source image prior to projecting the image onto the projection surface. Illustrative implementations are also described below for modifying a source image prior to projecting the image based on a shape and/or position of the projection surface. The various implementations of the techniques described herein are merely representative.

Illustrative Environment

Figure 1:
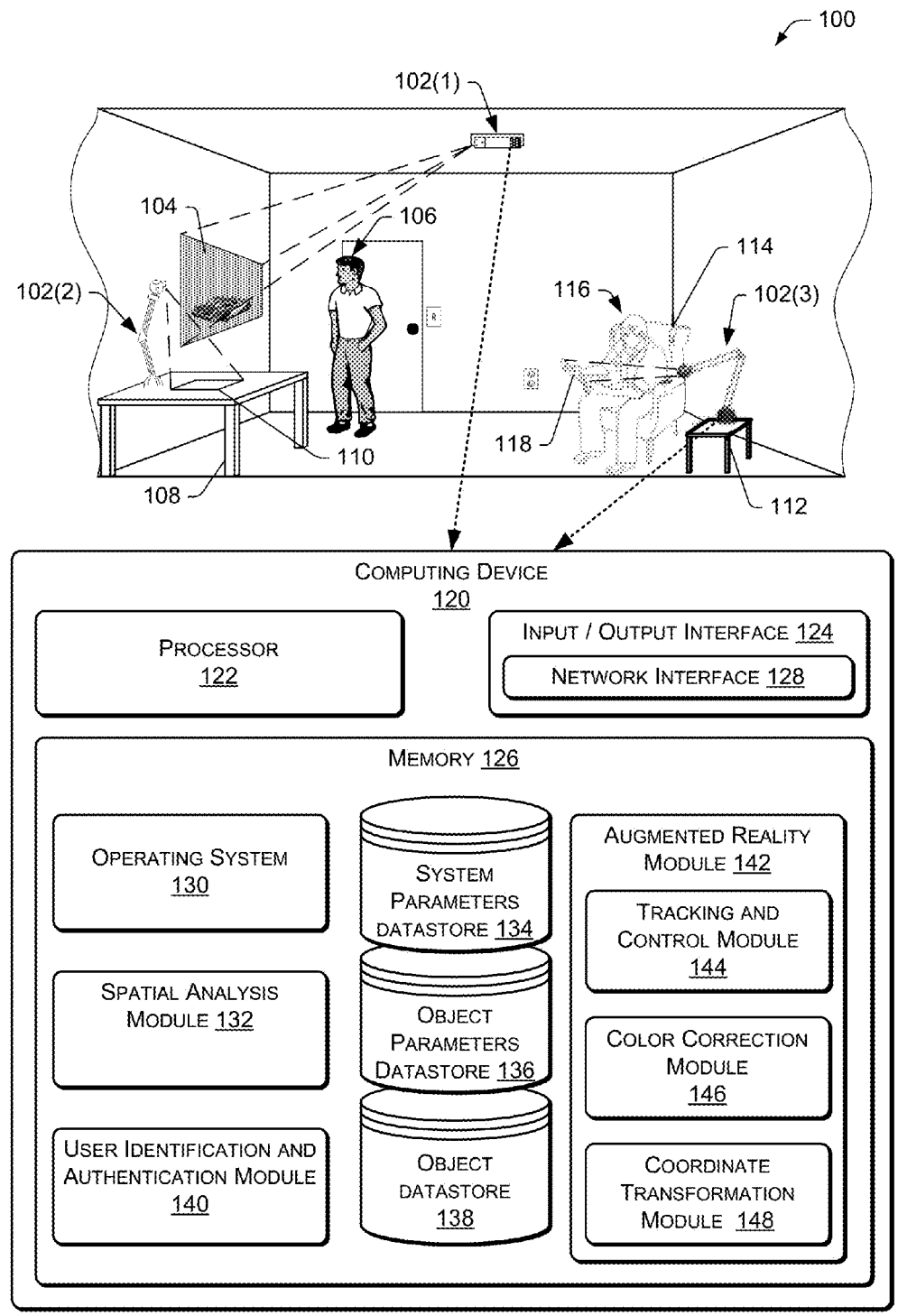
FIG. 1 shows an illustrative scene with an augmented reality environment hosted in an environmental area, such as a room. The augmented reality environment is provided, in part, by three projection and image capture systems.

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction. One implementation of the first ARFN 102(1) is provided below in more detail with reference to FIG. 2.

A second ARFN 102(2) is embodied as a table lamp, which is shown sitting on a desk 108. The second ARFN 102(2) projects images 110 onto the surface of the desk 108 for the user 106 to consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a portable projection screen 118. The third ARFN 102(3) projects images onto the surface of the portable screen 118 for the user 116 to consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations. In other implementations, one or more ARFNs may be placed around the room in any number of arrangements, such as on or in furniture, on the wall, beneath a table, and so forth.

Associated with each ARFN 102(1)-(3), or with a collection of ARFNs, is a computing device 120, which may be located within the augmented reality environment 100 or disposed at another location external to the augmented reality environment 100. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

The augmented reality module 142 also includes a color correction module 146 and a coordinate transformation module 148. The color correction module 146 is configured to pre-process a source image based on a projection surface color. The coordinate transformation module 148 is configured to determine transformations between various coordinate systems within the environment, and to apply the determined transformations to images to be projected within the environment.

The ARFNs 102 and computing components of device 120 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

Example ARFN Implementation

Figure 2:
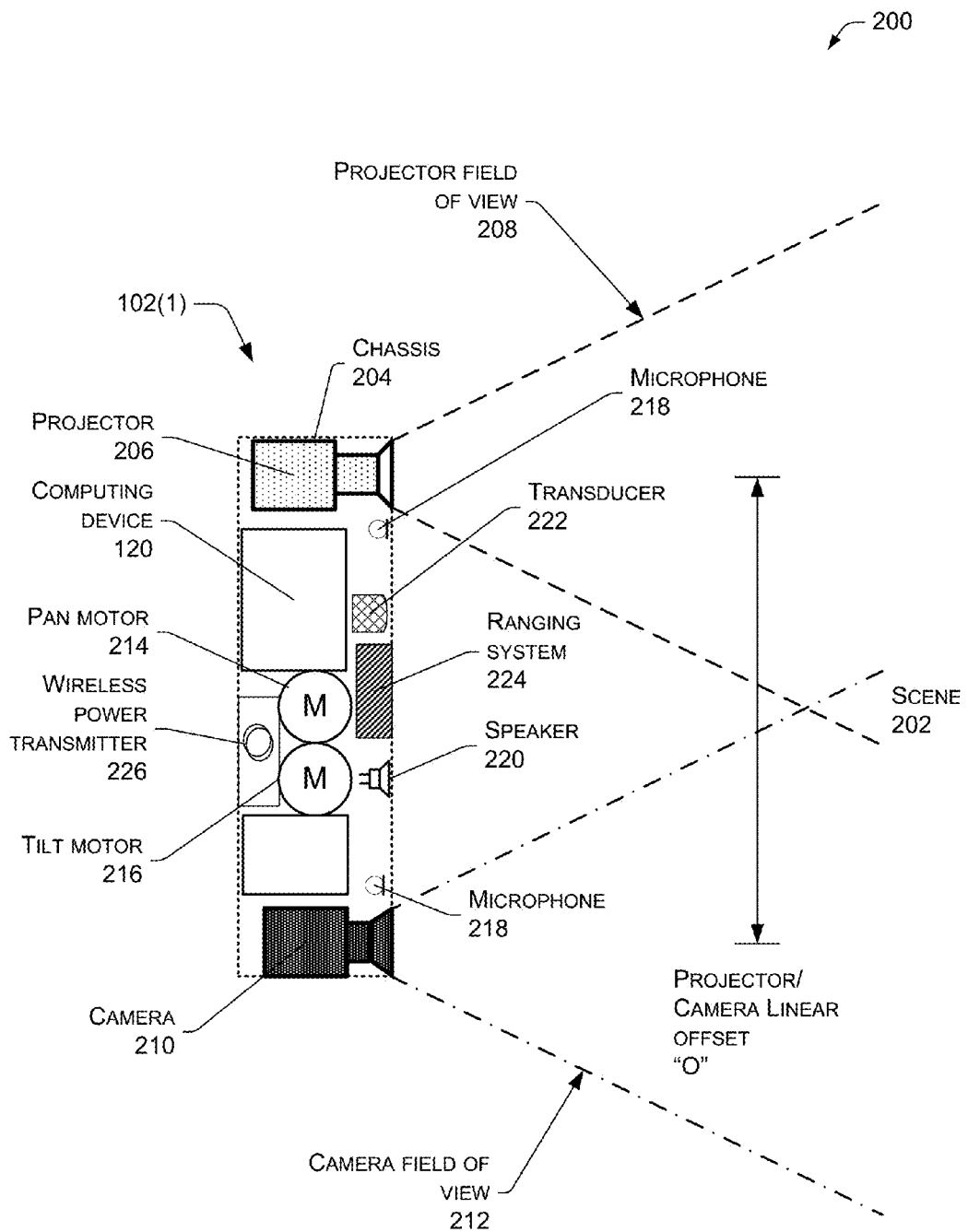
FIG. 2 shows an implementation of a projection and image capturing system formed as an augmented reality functional node having a chassis to hold a projector and camera.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera may be embodied as an RGB camera. In other instances, the camera may include time-of-flight (ToF) sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
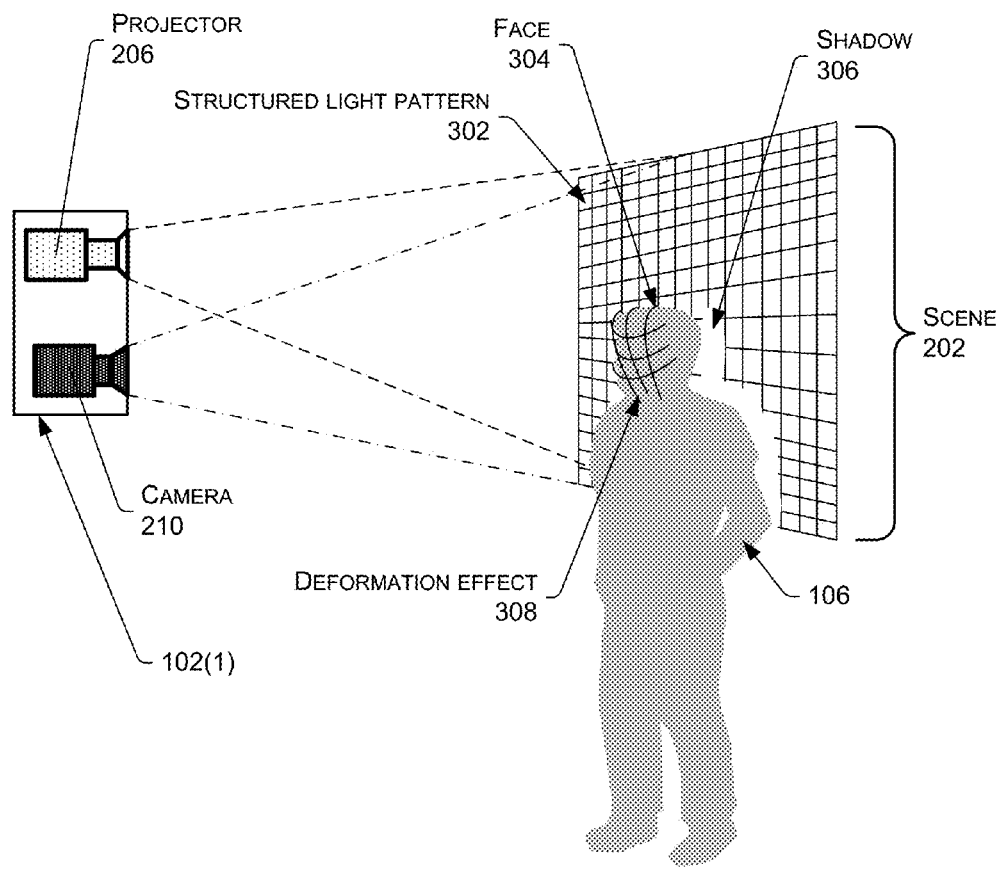
FIG. 3 illustrates one example implementation of creating an augmented reality environment by projecting a structured light pattern on a scene and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 132 to characterize the scene 202 or to define coordinate systems within the scene. In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user or to determine a position of the user's eyes and the direction that the user is looking. In still other instances, images may be captured by the camera 210 to determine characteristics of a projection surface prior to projecting a source image onto the projection surface. Characteristics of the projection surface may include, but are not limited to, color, reflectivity, and physical shape.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

Example Image Color Correction

Various characteristics of a projection surface can affect how an image displayed on the surface appears to a user. For example, surfaces that are non-white, not uniform in color, highly reflective, irregularly shaped, and so on, can all affect the appearance of an image projected onto the surface. Various techniques may be implemented to account for, at least in part, effects on a projected image caused by characteristics of the projection surface.

Figure 4:
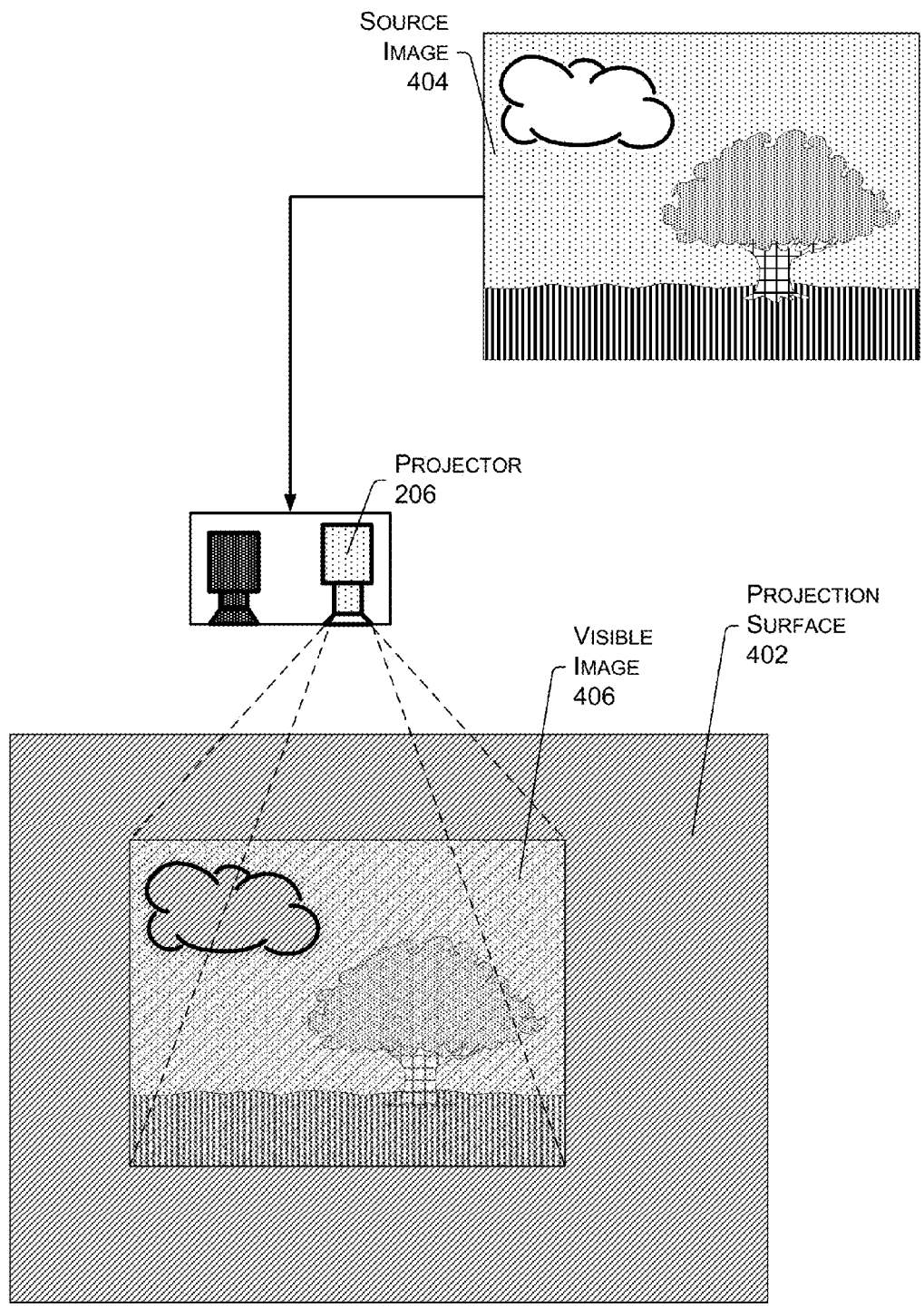
FIG. 4 illustrates example image distortion when a color image is projected onto a non-white projection surface.

FIG. 4 illustrates image distortion when a color image is projected onto a non-white projection surface. As illustrated in FIG. 4, a projection surface 402 within an environment may be non-white. For example, a table top or wall may be painted a non-white color and used as a projection surface. Even more distortion may be caused if the projection surface is irregular in color. For example, a speckled countertop, a wood-grain surface, patterned wall paper, a tile surface, and so on. Although the projection surface 402 is illustrated in FIG. 4 as being uniform, but non-white in color, the techniques described herein may be equally applied if the projection surface is non-uniform in color. In the example illustrated in FIG. 4, the projection surface 402 is approximately uniform in color, but is non-white in color. The non-white color of projection surface 402 is represented by diagonal hash lines.

An example source image 404 includes, for example, dark green grass (represented by vertical hash lines), a tree having a brown trunk (represented by horizontal and vertical hash lines) and light green leaves (represented by a heavily dotted area), a light blue sky (represented by a lightly dotted area), and a white cloud. When the source image 404 is projected onto the projection surface 402, the colors of the visible image 406 on the projection surface are distorted due to the non-white color of the projection surface 402.

Figure 5:
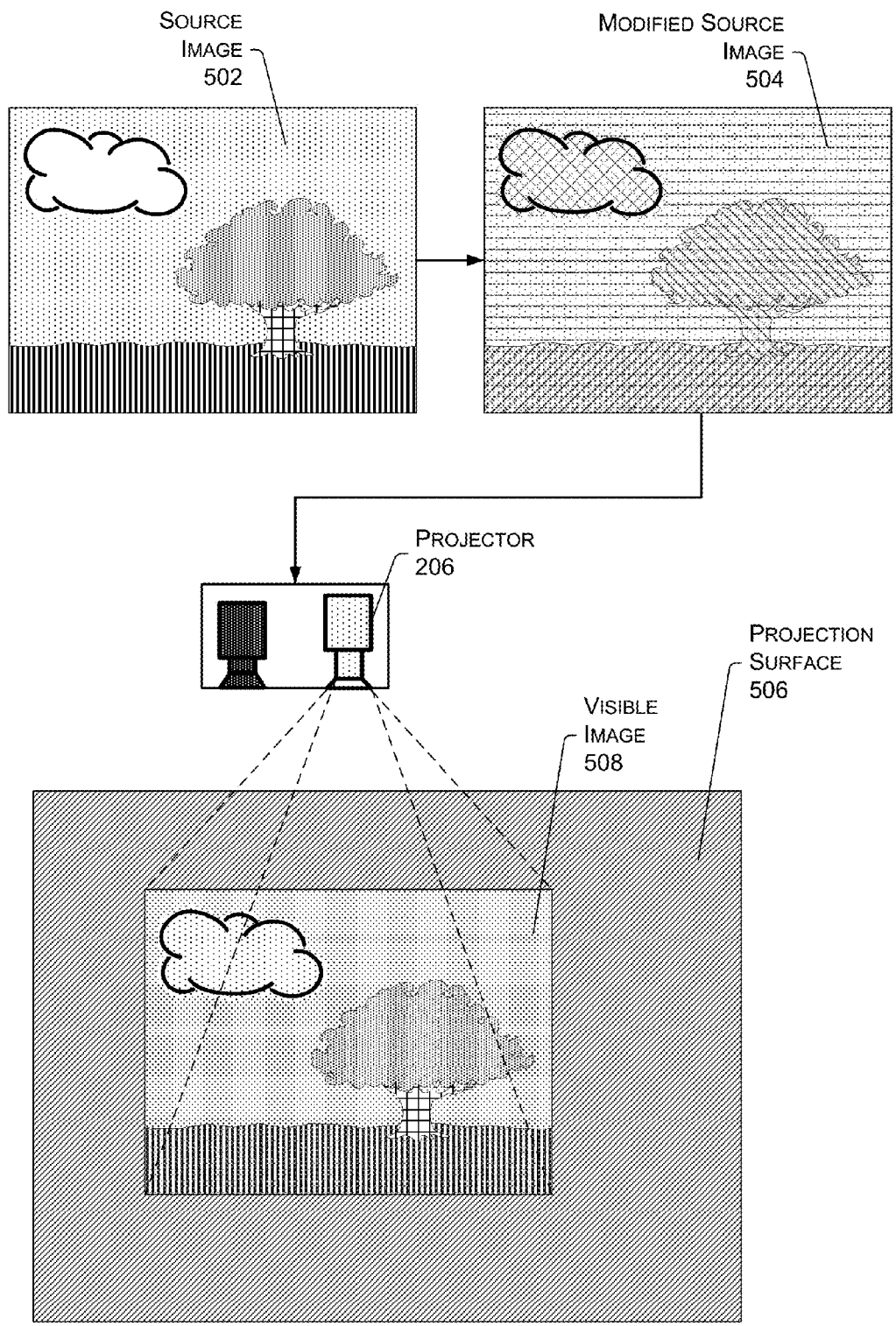
FIG. 5 illustrates example modification of a source image to account for a non-white image projection surface.

FIG. 5 illustrates modification of a source image to account for a color of a projection surface prior to projecting the image onto the projection surface. A source image 502 is pre-processed, resulting in a modified source image 504. The modified source image 504 is then projected onto the projection surface 506, resulting in a visible image 508. The pre-processing color modification results in a visible image 508 that more closely resembles the source image 502 than if no color modification were done (as illustrated in FIG. 4).

Various techniques may be used to modify color values in a source image prior to projecting the image onto a projection surface. For example, in one implementation, color values sampled from the projection surface may be subtracted from color values in the source image. Then, when the modified image is projected onto the projection surface, the color of the projection surface will combine with the modified colors in the image, resulting in a visible image with colors that are approximately the same as the colors in the source image. In an alternate implementation, the modified image is created based on a color map that is generated by projecting specific color values onto the projection surface, sampling the resulting visible color values, and mapping the projected color values to the resulting visible color values.

Figure 6:
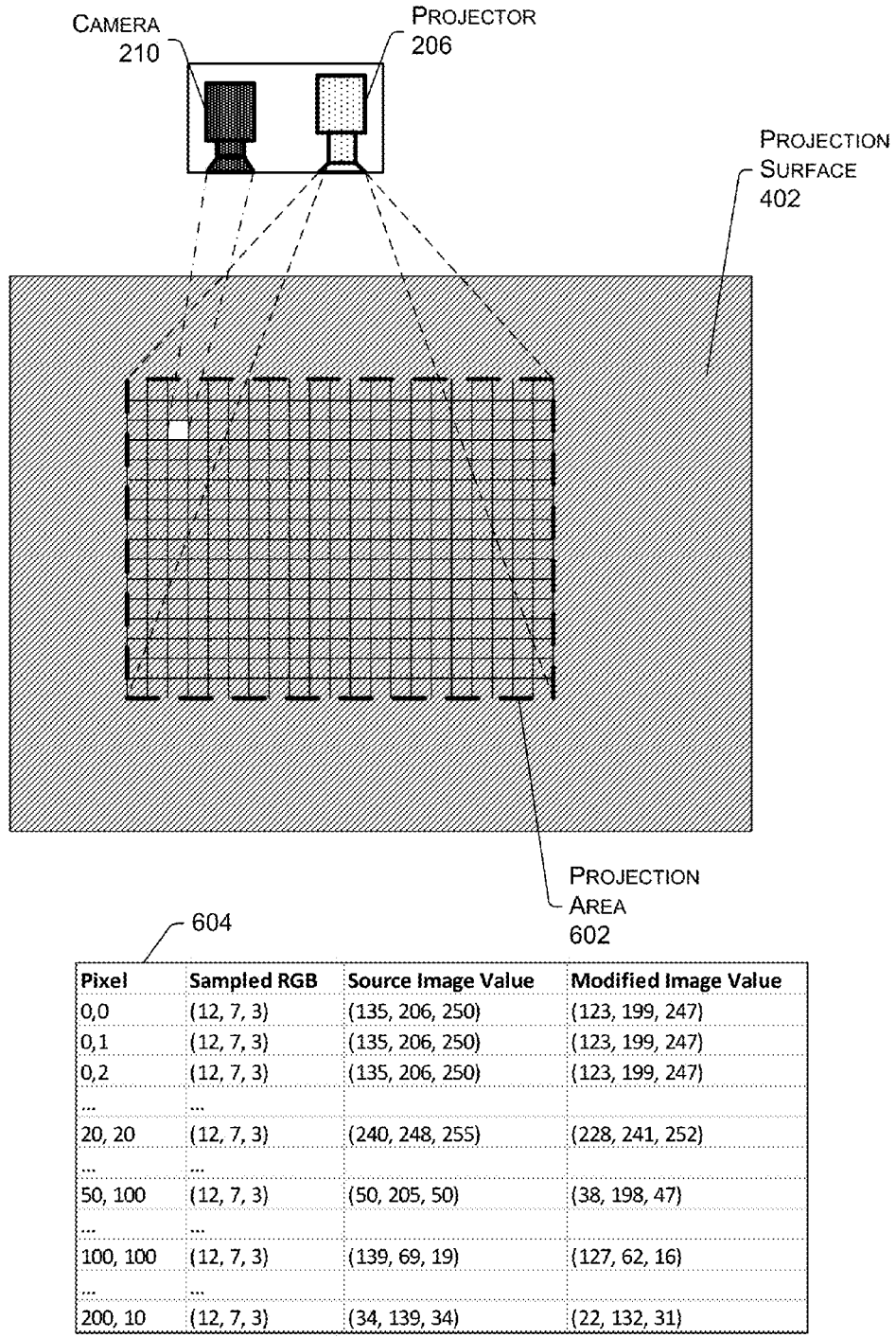
FIG. 6 shows example source image modification based on color values sampled from a projection surface.

FIG. 6 illustrates example source image modification based on color values sampled from the projection surface. In the illustrated example, prior to projecting a source image onto the projection surface 402, the camera 210 samples color values across the projector field of view, which corresponds to the projection area 602 where the source image will be projected. For each pixel within the projector field of view, the camera samples the color value of the projection surface. The table 604 at the bottom of FIG. 6 illustrates example sample values from a uniformly-colored projection surface 402. As shown, for each pixel, the sampled value is an RGB value of (12, 7, 3).

The table 604 also illustrates how the sampled values are used to modify the source image to generate a modified source image. For example, a blue area of the source image having an RGB value of (135, 206, 250) is generated in the modified source image to have an RGB value of (123, 199, 247) by subtracting the sampled value of (12, 7, 3) from the source image value. The table 604 illustrates additional example pixel values for portions of the source image corresponding to a white cloud, green leaves on a tree, a brown tree trunk, and green grass.

Subtracting a sampled RGB value corresponding to the projection surface from an RGB value of a source image to generate a modified image may not always have the desired result. For example, if a value of at least one of the channels of the RGB value corresponding to the projection surface is greater than the corresponding value in the source image, the full value from the projection surface cannot be subtracted from the source image value. For example, if the red channel of a particular pixel in the source image has a value of 20 and the red channel of the corresponding location on the projection surface has a value of 60, then the subtraction cannot be entirely performed. In other words, since there is only a value of 20 in the source image, only a value of 20 can be subtracted. However, since the projection surface has a corresponding value of 60, subtracting the 20 from the source image value will not fully account for the red that will be contributed to the image at that location from the projection surface. As such, depending on the color of the projection surface and the colors in the source image, this approach to color correction may be insufficient or inconsistent in at least some areas of the image.

If the camera 210 has a higher resolution than the projector 206 and the surface is non-uniform in color, multiple sampled values may correspond to a single pixel to be projected. Various techniques may be used to account for this scenario, including, but not limited to, averaging the multiple sampled values that correspond to a single pixel to be projected.

Furthermore, in addition to surface color, other characteristics of the projection surface may also affect the way projected images appear. For example, an image projected onto a relatively matte surface (e.g., a matte painted wall) may appear different from the same image projected onto a highly reflective surface (e.g., a glossy tile surface).

Figure 7:
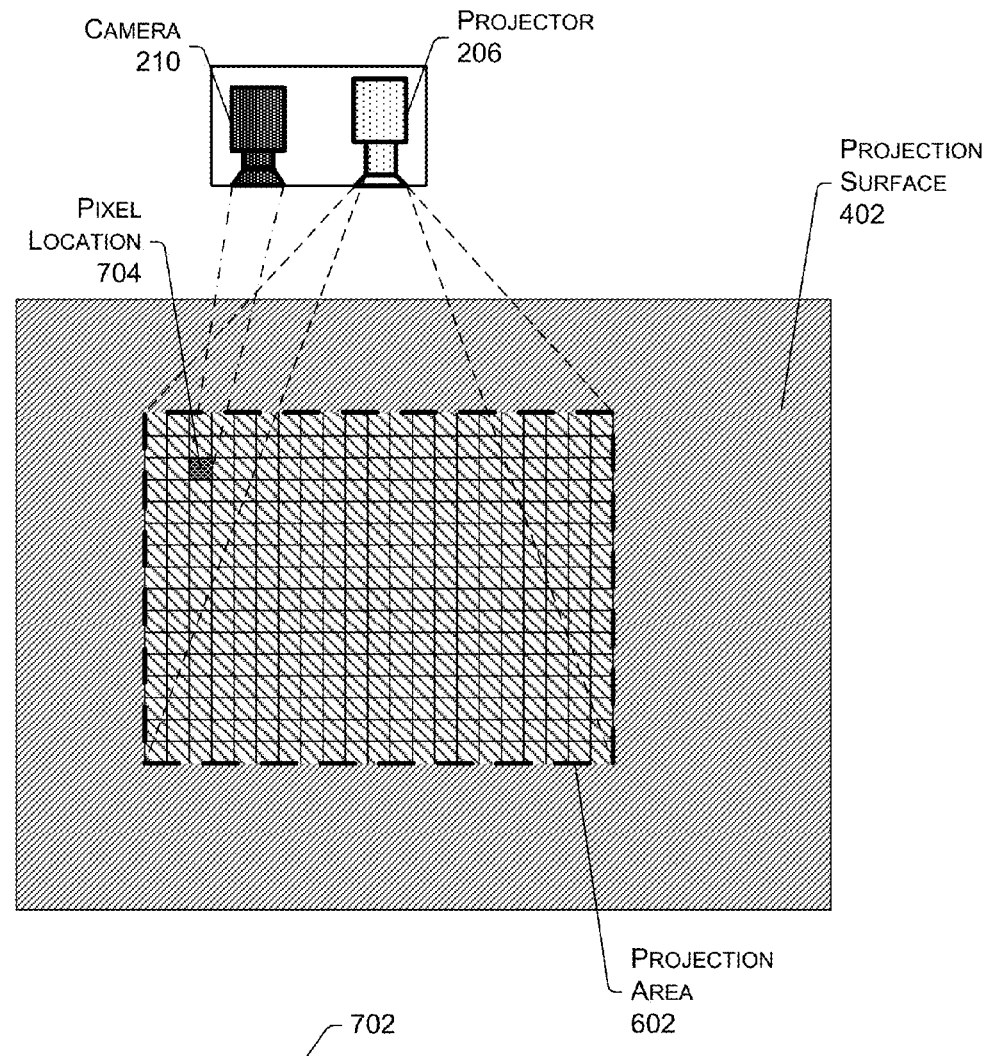
FIG. 7 shows example color mapping for image modification based on a sampled display of known projected color values.
Figure 8:
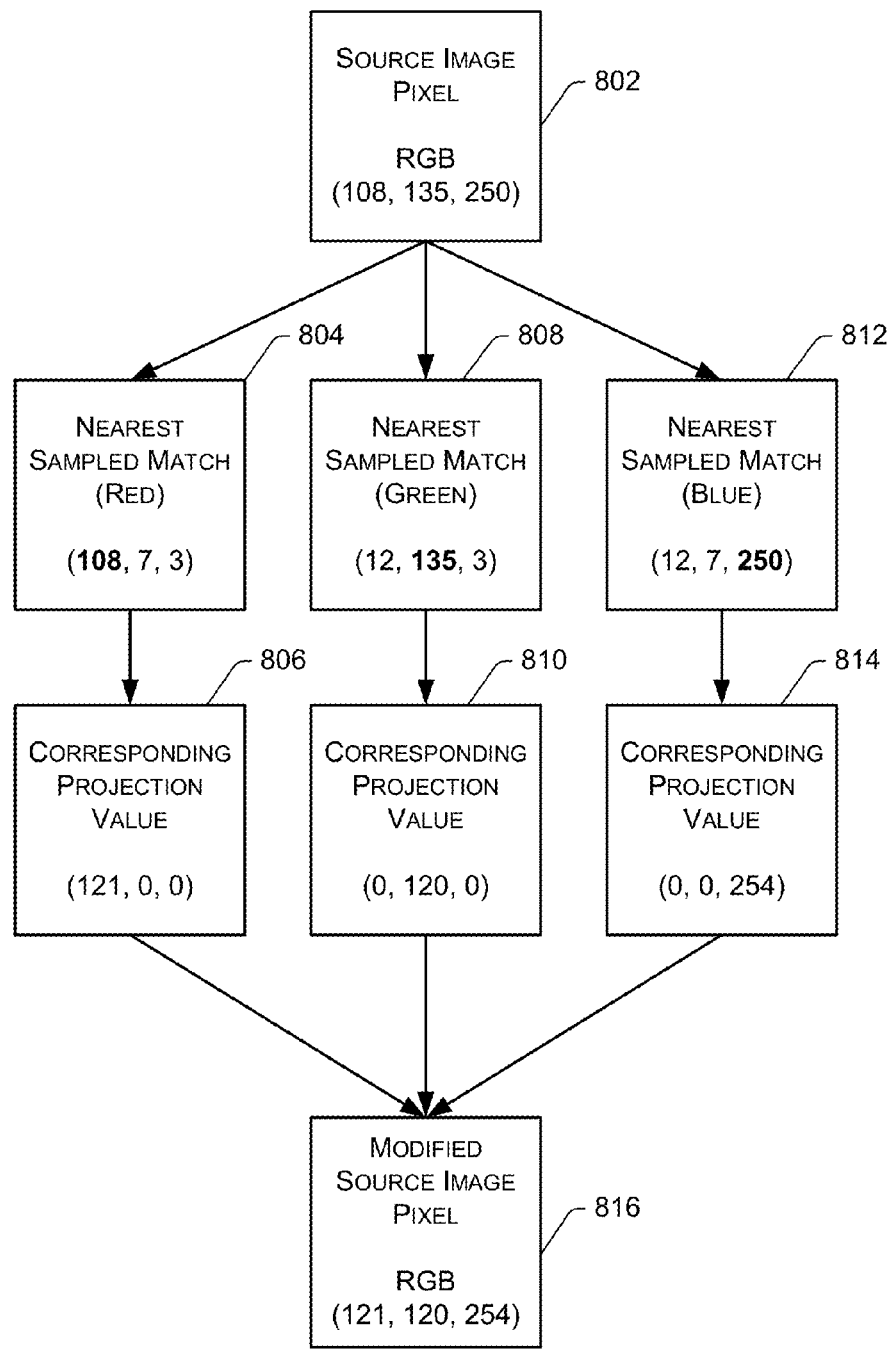
FIG. 8 shows generation of a modified image pixel based on a color mapping as illustrated in FIG. 7.

FIGS. 7 and 8 illustrate an alternate implementation for generating a modified source image based on color values sampled from the projection surface. In the illustrated implementation, known RGB values are projected on the projection surface and the resulting visible color on the projection surface is sampled. In one implementation, for each channel (R, G, and B), a minimum value (0) and a maximum value (255) are projected and the results subsequently sampled. Any number of additional values between the minimum and maximum values may also be projected and the result sampled. The more values that are projected and sampled, the more accurate the mapping. Projected and sampled colors may be limited to individual channels or any number of channel combinations may also be projected and sampled.

FIG. 7 illustrates a table 702 of projected and corresponding sampled RGB values at a particular pixel location 704 within the projection area 602 on the projection surface 402. In the illustrated example, projected values of red between 0 and 255 map to sampled values between 12 and 212. Similarly, projected values of green between 0 and 255 map to sampled values between 7 and 255; and projected values of blue between 0 and 255 map to sampled values between 3 and 250.

FIG. 8 illustrates the creation of a modified source image pixel based on the mapping described above with reference to FIG. 7. As indicated in block 802, the source image pixel has an RGB value of (108, 135, 250). Based on the mapping, the closest sampled value in the red channel (block 804) has an RGB value of (108, 7, 3), and maps to a projected RGB value of (121, 0, 0), shown in block 806. Similarly, the closest sampled value in the green channel (block 808) has an RGB value of (12, 135, 3) and maps to a projected RGB value of (0, 120, 0), shown in block 810; and the closest sampled value in the blue channel (block 812) has an RGB value of (12, 7, 250) and maps to a projected RGB value of (0, 0, 254), shown in block 814. When the three projected RGB values (blocks 806, 810, and 814) are combined, they form a modified source pixel (block 816) with an RGB value of (121, 120, 254), which when projected, will approximate the source image pixel having RGB value of (108, 135, 250). This process is repeated for each pixel of the source image to generate a modified source image.

Figure 9:
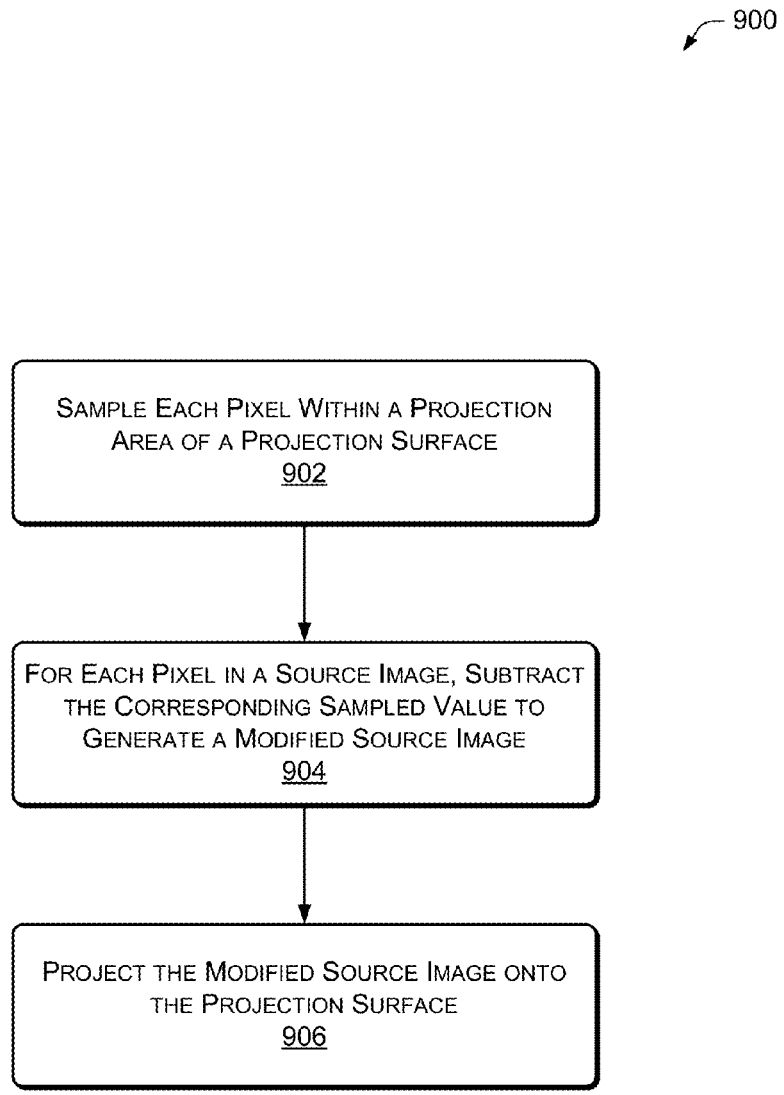
FIG. 9 shows an illustrative process of generating a modified source image by subtracting, from a source image, color values sampled from a projection surface.

FIG. 9 shows an illustrative process 900 of generating a modified source image by subtracting sampled projection surface RGB values from RGB values of a source image. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 902, each pixel within a projection area of a projection surface is sampled. In one implementation, the RGB camera 210 as shown in the example of FIG. 2 samples the projection area, which corresponds to the projector field of view 208. An RGB value is determined for each pixel within the projection area.

At 904, for each pixel in a source image, the RGB value sampled from the corresponding location within the projection area is subtracted from the RGB value of the source image pixel to generate a modified source image. For example, color correction module 146 receives the sampled RGB values from the RGB camera 210 and subtracts the sampled RGB values from the corresponding pixel RGB values in the source image, generating a modified source image.

At 906, the modified source image is projected onto the projection surface. For example, the modified source image generated by the color correction module 146 is projected by the projector 206.

Figure 10:
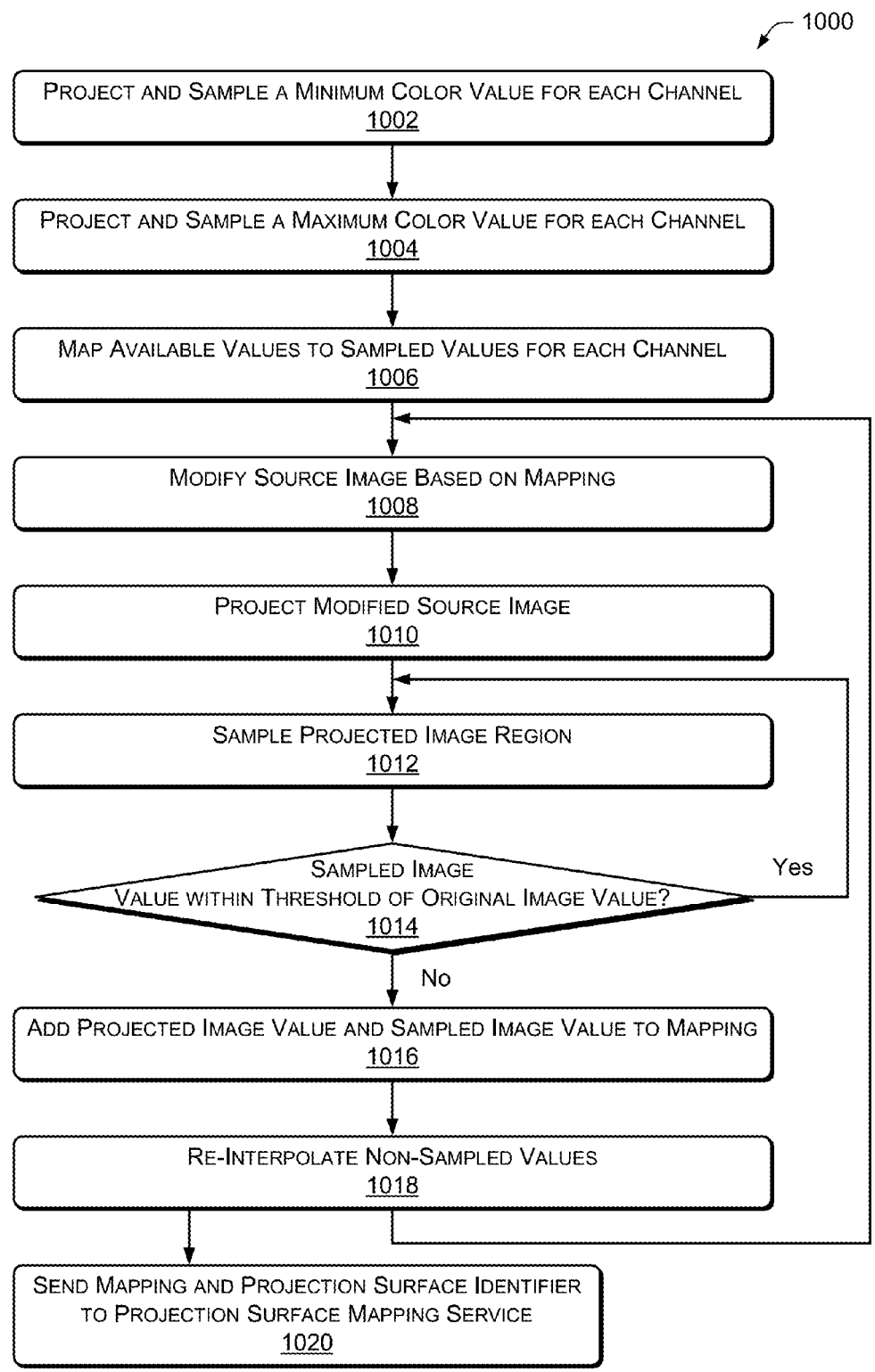
FIG. 10 shows an illustrative process of generating a modified source image based on a mapping of sampled displayed color values to known projected color values.

FIG. 10 shows an illustrative process 1000 for color correcting a projection image. In an example implementation, the process 1000 is performed for each pixel within a projection area.

At 1002, a minimum color value is projected and sampled for each channel. For example, in one implementation, the projector 206 projects an RGB value of (0, 0, 0) onto the projection surface, and the camera 210 samples the resulting display. The sampled RGB value represents the minimum visible value in each channel.

At 1004, a maximum color value is projected and sampled for each channel. For example, in one implementation, the projector 206 projects an RGB value of (255, 0, 0) onto the projection surface, and the camera 210 samples the resulting display. The sampled RGB value represents the maximum visible value in the red channel. Similarly, RGB values (0, 255, 0) and (0, 0, 255) are projected and sampled for the green and blue channels.

At 1006, for each channel, the available RGB values (e.g., 0-255 for each channel) are mapped according to the sampled minimum and maximum values in the corresponding channel. In an example implementation, the color correction module 146 performs a linear interpolation to map each available RGB value in a particular channel to a corresponding visible value in the same channel. In alternate implementations, other types of interpolation may be used to perform the mapping.

At 1008, a source image is modified based on the mapping. In an example implementation, the color correction module 146 modifies each pixel from the source image to generate a modified source image, as illustrated in FIG. 8. For example, for each pixel in the source image, a nearest sampled match in each channel is identified. For each nearest sampled match, the corresponding projected RGB value is identified. The three projected RGB values (one for each channel) that correspond to the three nearest sampled matches (one for each channel) are combined to generate a modified pixel value.

At 1010, the modified source image is projected onto the projection surface. For example, the projector 206 projects the modified source image onto the projection surface.

Blocks 1012-1018 represent additional processing that may be performed in an example implementation to iteratively improve the mapping between available RGB values and visible RGB values. To obtain a mapping that is as accurate as possible, each possible RGB color value could be projected and sampled for each pixel within the projection area. However, this may be time and computationally costly, and may not be necessary. For example, in some scenarios, it may be sufficient to project and sample only a minimum RGB value and a maximum RGB value, and perform a linear interpolation between the two to generate the mapping. However, in other scenarios, if only a minimum and maximum value for each channel are initially sampled, and a linear interpolation is employed to determine the remaining mapping values, the mapping may be, at least in some degree, inaccurate. It may be that a particular range of RGB values, when sampled, are more true to the projected values than in other ranges. In this scenario, a linear interpolation may not result in an accurate mapping. Accordingly, an iterative approach may be used to verify and/or modify an initial mapping based on actual image projections.

At 1012, a region of the projected image is sampled. In an example implementation, while the modified source image is being projected onto the projection surface, the camera 210 samples at least a portion of the projected image. The sampled portion may be a single pixel, or the camera 210 may sample a number of pixels, for example, within an area having a similar color.

At 1014, it is determined whether the sampled value from the projected image is within a threshold of a corresponding value in the original source image. In other words, a determination is made as to how different the projected image appears from the original source image. In an example implementation, each pixel value sampled from the projected image is compared to a corresponding pixel value in the original source image.

If the sampled pixel value is within a threshold of the corresponding pixel value in the original source image (the "Yes" branch from block 1014), then processing continues at 1012, with additional pixels or regions of the projected image being sampled. This continues until each region and/or each pixel of the projected image has been sampled.

On the other hand, if the sampled pixel value is not within a threshold of the corresponding pixel value in the original source image (the "No" branch from block 1014), then at 1016 the value currently being projected and the corresponding sampled value to the mapping. In an example implementation, color correction module 146 generates the mapping based on sampled values and interpolated values. If the value currently being projected was previously mapped to an interpolated value, then the interpolated value is replaced with the sampled value.

At block 1018, the interpolated values in the mapping are re-interpolated. For example, when the sampled value is added to the mapping, it may affect the previously interpolated values. Accordingly, the color correction module 146 re-interpolates the values in the mapping that are not based on a sampled value. Processing then continues as described above with reference to block 1008.

Block 1020 represents an optional process for sending the mapping to a projection surface mapping service. For example, a cloud-based service may maintain projection surface mappings for a variety of projection surfaces including, but not limited to, particular paint colors and finishes, particular countertop surfaces, particular furniture surfaces, and so on. In an example implementation, a user may subscribe to such a service to maintain a personal set of projection surface mappings that have been generated through a system used by the user. Alternatively, a user may subscribe to such a service to access projection surface mappings that have been generated by other users.

Figure 11:
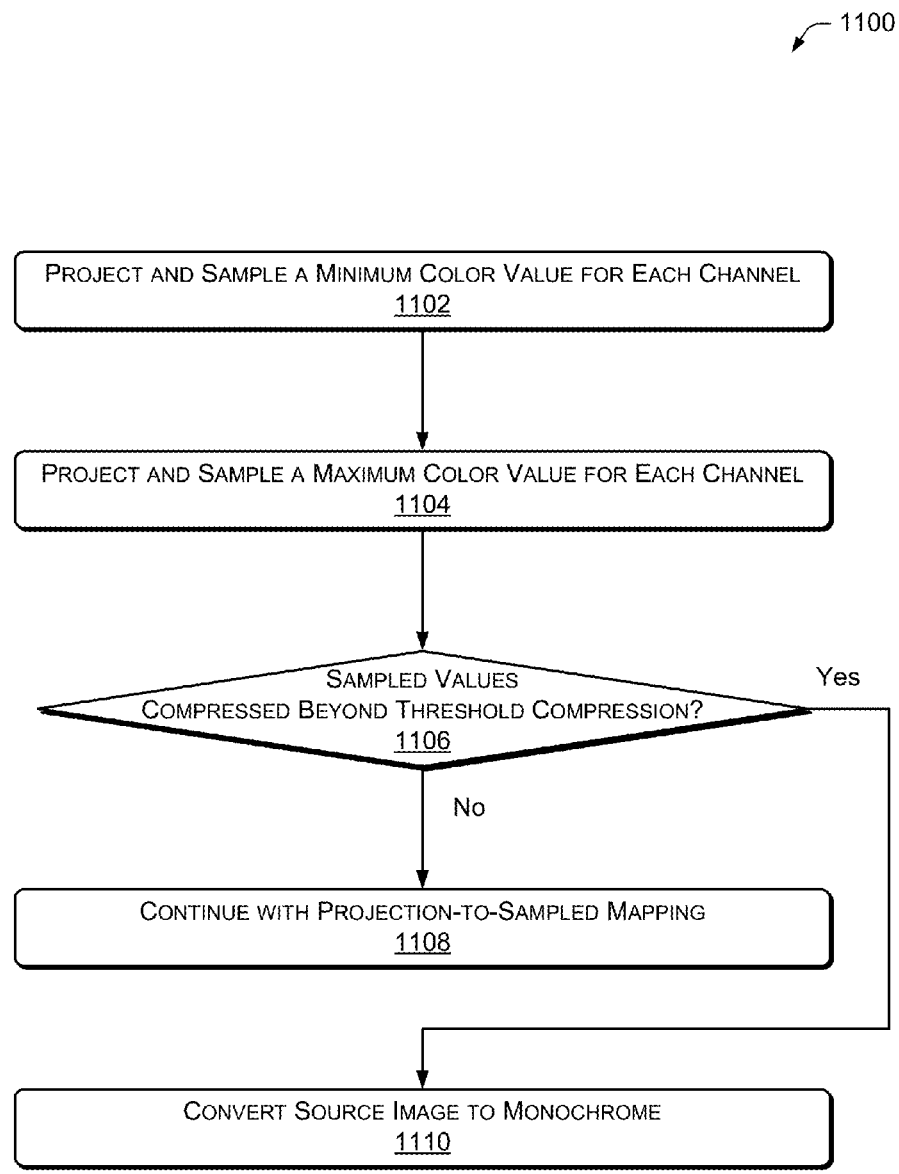
FIG. 11 shows an illustrative process of converting at least a portion of a color source image to a monochromatic image based on color characteristics of a projection surface.

FIG. 11 shows an illustrative process 1100 for converting at least a portion of a color source image to a monochromatic image based on color characteristics of a projection surface. If a particular projection surface results in a significantly compressed range of visible RGB values, it may not be feasible to sufficiently adjust a color source image for suitable display on the projection surface. In this scenario, one option is to convert the color image to a monochromatic image (e.g., grayscale). Because a range of RGB values needed for a monochromatic image is much smaller than for a full color image, the monochromatic image may be more visibly appealing than the full color image when displayed on the colored projection surface.

At 1102, a minimum color value is projected and sampled for each channel. For example, in one implementation, the projector 206 projects an RGB value of (0, 0, 0) onto the projection surface, and the camera 210 samples the resulting display. The sampled RGB value represents the minimum visible value in each channel.

At 1104, a maximum color value is projected and sampled for each channel. For example, in one implementation, the projector 206 projects an RGB value of (255, 0, 0) onto the projection surface, and the camera 210 samples the resulting display. The sampled RGB value represents the maximum visible value in the red channel. Similarly, RGB values (0, 255, 0) and (0, 0, 255) are projected and sampled for the green and blue channels.

At 1106, a determination is made as to whether or not the sampled RGB values are compressed beyond a threshold compression value. In an example implementation, the color correction module 146 compares the minimum and maximum sampled values in each channel. The color correction module 146 determines that the sampled values are compressed beyond a threshold compression if, for one or more of the channels, the difference between the maximum sampled value for the channel and the minimum sampled value for the channel is less than a threshold difference.

If it is determined that the sampled values are not compressed beyond a threshold compression (the "No" branch from 1106), then at 1108 the color correction module 146 continues mapping the projected values to the sampled values for generation of a modified source image, as described with reference to FIG. 10.

On the other hand, if it is determined that the sampled values are compressed beyond a threshold compression (the "Yes" branch from 1106), then at 1110, the color correction module 146 converts the source image to a monochromatic modified source image. Various techniques may be used for determining the base color for the monochromatic image, and for converting the source image to a monochromatic modified source image. Furthermore, in an example implementation, if there are one or more particular ranges of RGB values that are significantly compressed while the remaining ranges of RGB values are not overly compressed, the color correction module 146 may convert only a portion of the source image to monochrome. For example, a source image may include colored text in an RGB range that is significantly compressed, while the remainder of the image has RGB values that are not significantly compressed. In this scenario, the color correction module 146 may perform color correction on the majority of the image and convert just the text portion to a more legible monochromatic image region.

Example Image Modification Based on Surface Structure

Figure 12:
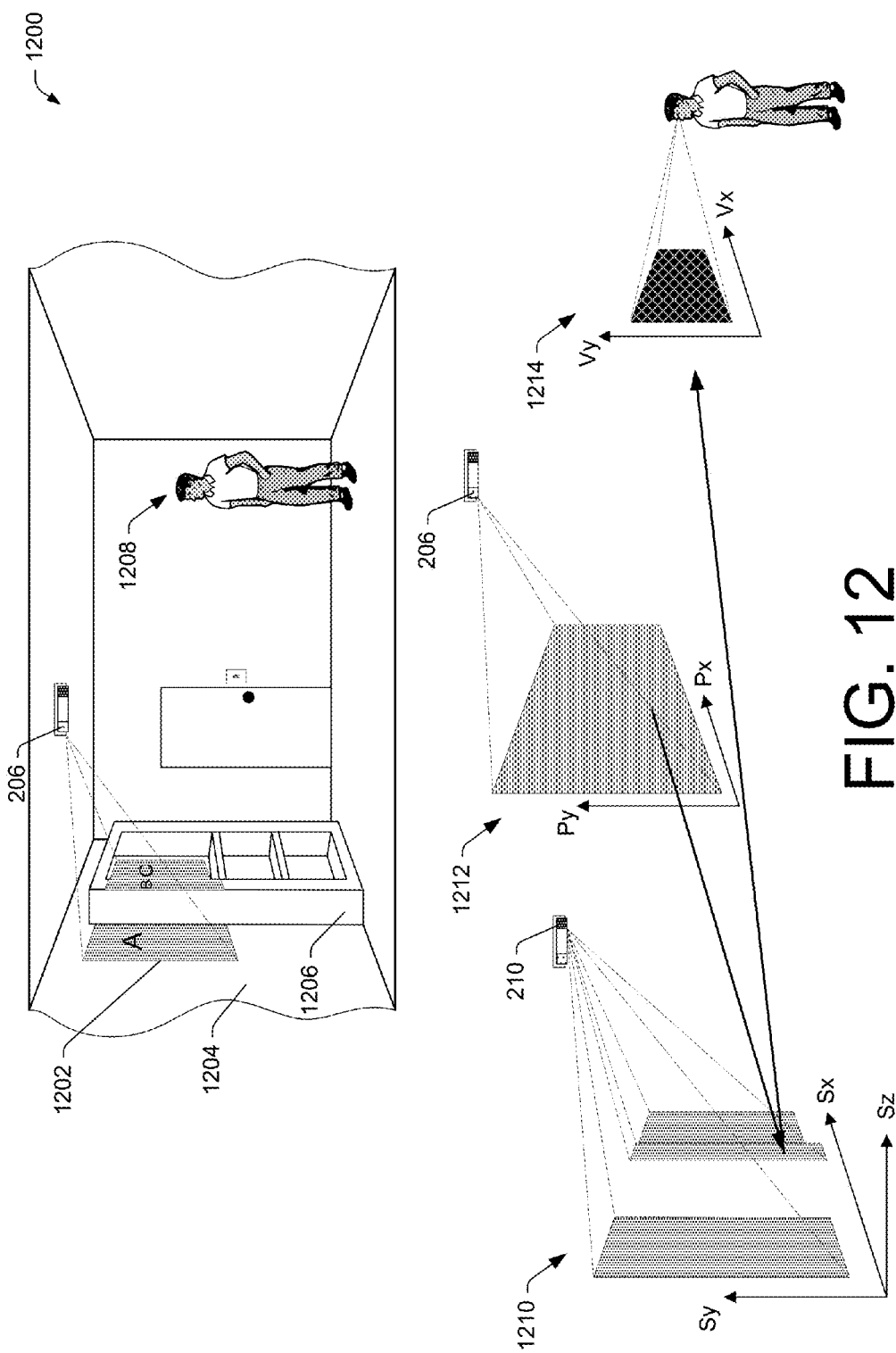
FIG. 12 illustrates example coordinate systems within an augmented reality environment for transforming source images to account for irregular projection surfaces.
Figure 13:
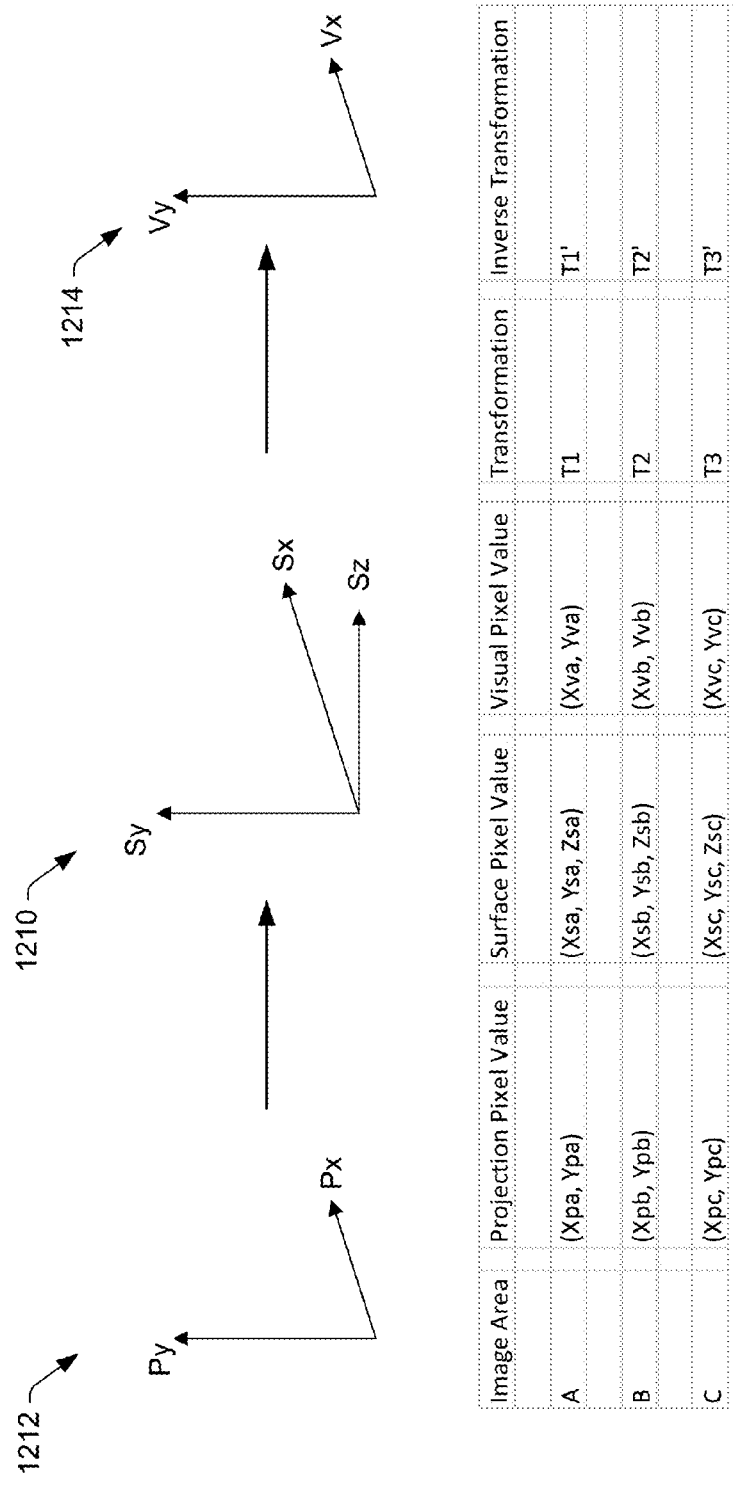
FIG. 13 illustrates example transformations between a projection coordinate system and a visual coordinate system.
Figure 14:
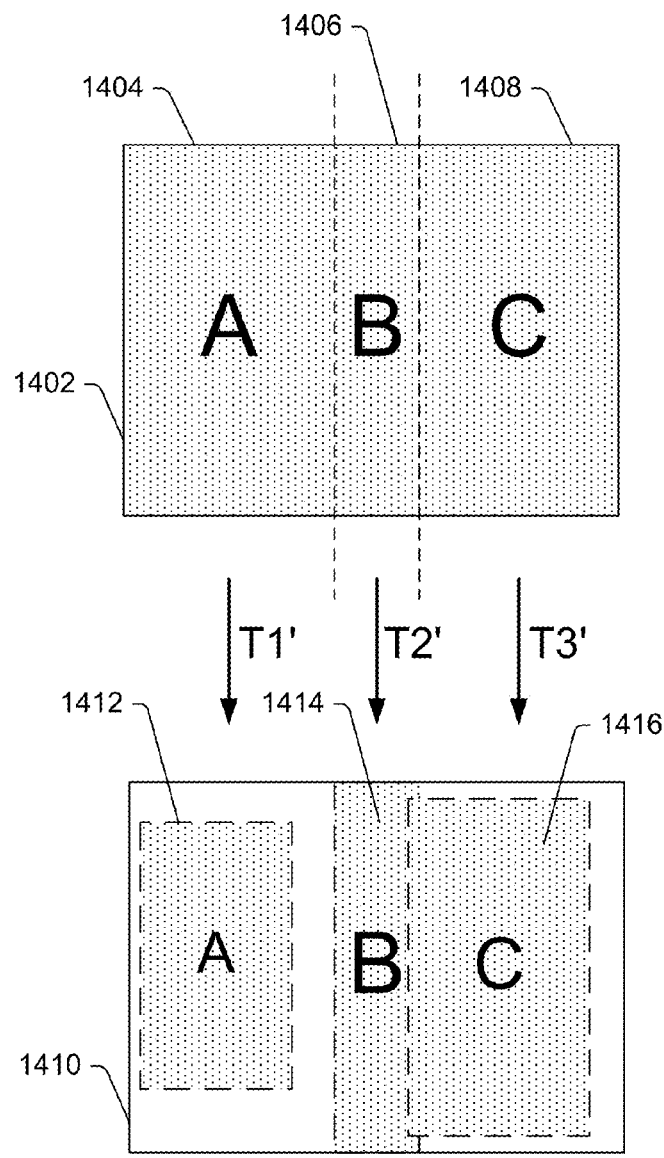
FIG. 14 illustrates example transformations applied to a source image to generate a modified source image.
Figure 15:
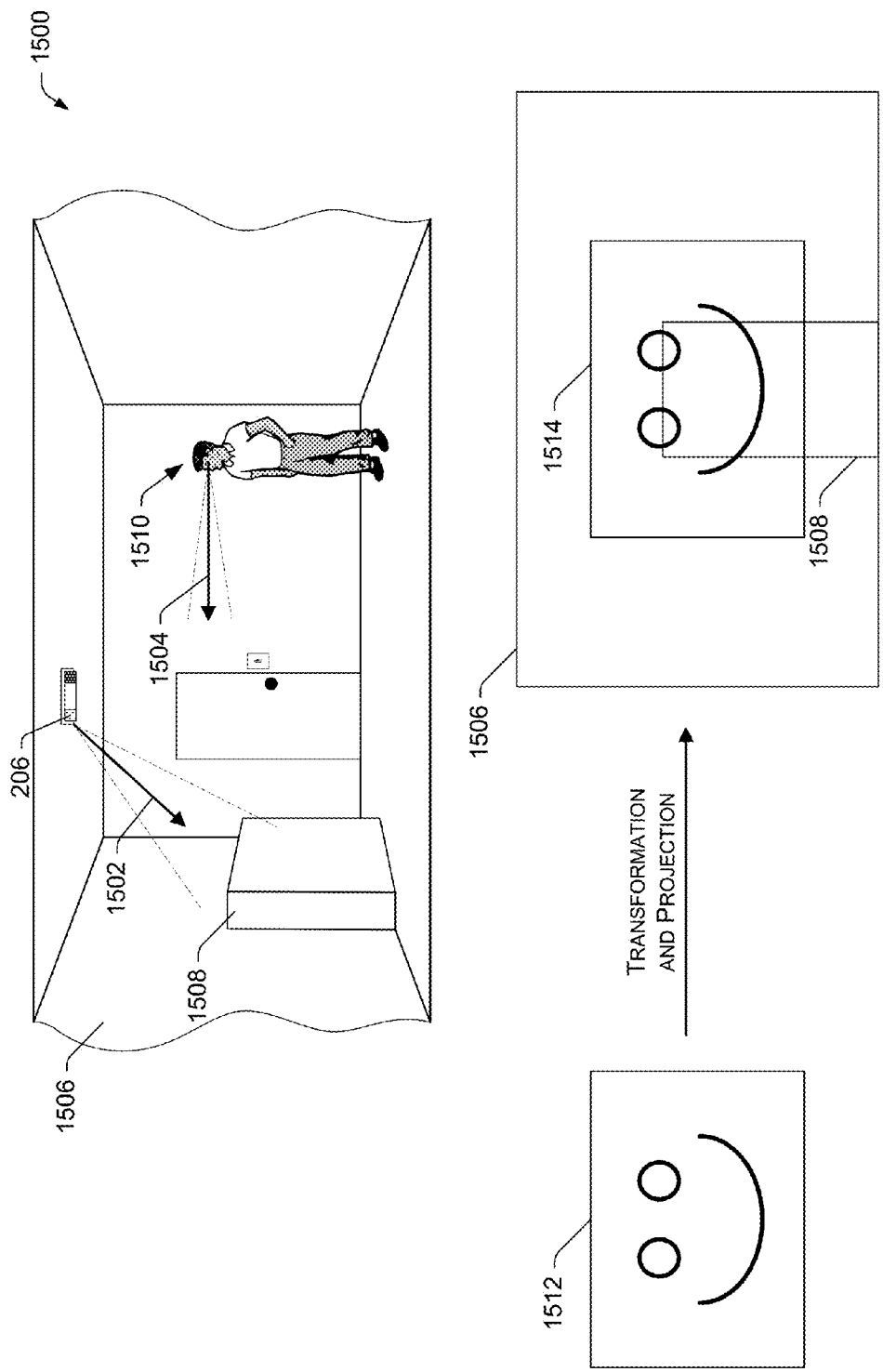
FIG. 15 illustrates transformation and projection of an image within an augmented reality environment to account for a difference between a projection angle and a viewing angle.
Figure 16:
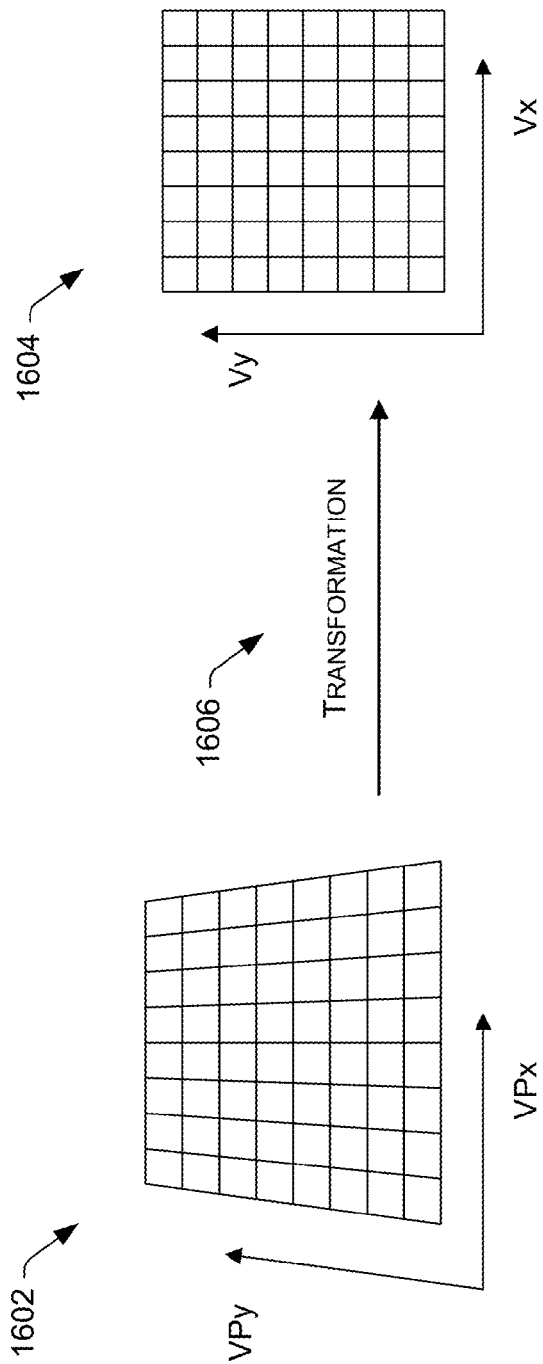
FIG. 16 illustrates example coordinate system from the user's perspective that represents a projection area and a viewing area.
Figure 17:
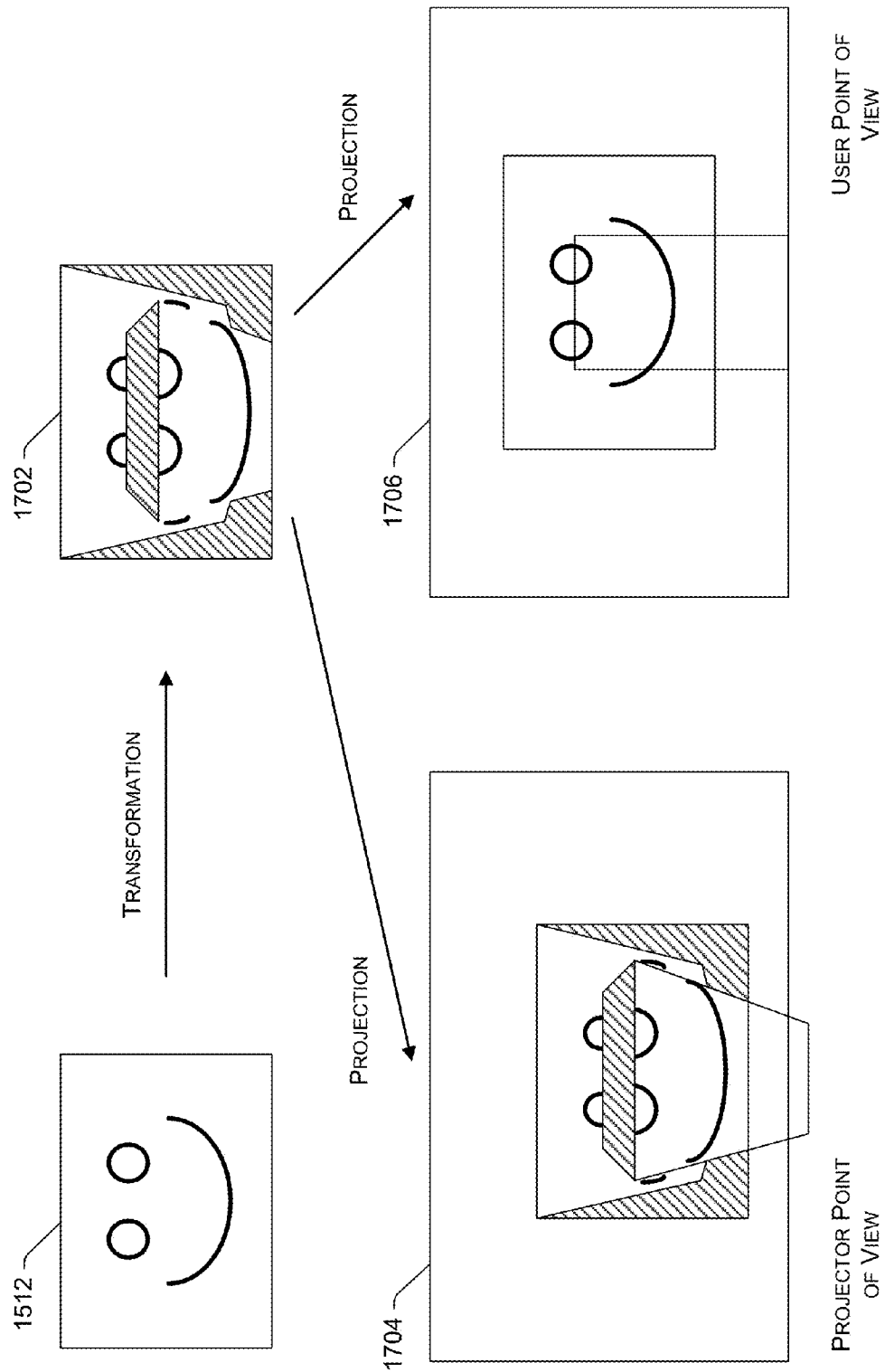
FIG. 17 illustrates an example source image, corresponding modified source image, and resulting projected image from multiple perspectives.

FIGS. 12-17 illustrate examples of image modification prior to projection. Image distortion occurs as a result of a combination of the different distances of each surface from the projector and as a result of the difference between the projection angle and the viewing angle. While both of these factors are considered when modifying an image to be projected, to simplify the discussion, FIGS. 12-14 illustrate an example in which adjustments are made for image distortion based on the different distances of each surface from the projector (not necessarily accounting for differences between a projection angle and a viewing angle), including a detailed discussion of multiple coordinate systems and transformations between those coordinate systems. FIGS. 15-17 then illustrate an example in which adjustments are made for image distortion based on both the different distances of each surface from the projector and the difference between the projection angle and the viewing angle. The coordinate systems and transformations described with reference to FIGS. 12-14 apply in equal measure to the example illustrated and described with reference to FIGS. 15-17.

FIG. 12 shows an illustrative augmented reality environment 1200 in which three coordinate systems are defined to account for image distortion based on distances between the projection surface and the projector. As illustrated in FIG. 12, the environment may include irregular surfaces onto which images may be projected.

In the example of FIG. 12, an image 1202 may be projected toward a wall 1204 against which a bookshelf 1206 has been placed. Because the projection surface is not uniformly flat in relation to the projector, the displayed image will appear distorted to the user 1208. In the illustrated example, a left portion of the image is displayed on the wall surface a middle portion of the image is displayed on a front edge of the bookshelf, and a right portion of the image is displayed on a back surface of the inside of the bookshelf. As mentioned above, image distortion occurs at least as a result of the different distances of each surface from the projector. For example, if the image, as illustrated in FIG. 12, includes text of a uniform size, because of the different surfaces of the bookshelf the text will appear to have differing sizes when displayed. That is, in the illustrated example, the "A" appears largest because it is projected on a surface furthest from the projector. The "C" appears slightly smaller because it is projected on a surface that is slightly closer to the projector, and the "B" appears smaller still because it is projected on a surface that is even closer to the projector.

Visual representation of an image projected onto an irregular surface can be improved through a series of coordinate system transformations. As illustrated in the lower portion of FIG. 12, three coordinate systems are defined. Surface coordinate system (Sx, Sy, Sz) 1210 is a three-dimensional coordinate system that is used to represent the physical characteristics of the projection surface. Surface coordinate system 1210 is determined, for example, from information captured from depth camera 210. As illustrated in FIG. 12, the surface coordinate system 1210 includes a horizontal x-dimension, a vertical y-dimension, and a depth dimension, represented by z. In an example implementation, the values of the z-dimension may represent perpendicular distances from a fixed plane that is parallel to the wall. In an alternate implementation, the values of the z-dimension may represent distances from a point on the wall to the fixed location of the camera 210. Projection coordinate system (Px, Py) 1212 is a two-dimensional coordinate system that is used to represent positions of image pixels projected from projector 206. Visual coordinate system (Vx, Vy) 1214 is a two-dimensional coordinate system that is used to represent a desired two-dimensional area for viewing a projected image.

The size and position of the visual coordinate system 1214 is based on the position of the user 1208, and more specifically, may be based on the location of the user's eyes. For example, a camera may be used to capture images of the user to discern a location of the user's eyes. Alternatively, the user may wear a detectable sensor (e.g., in a pair of glasses) from which the system is able to detect the user's position. Any number of techniques may be used to determine a viewing position of the user for the purpose of defining visual coordinate system 1214.

When an image is projected from projector 206 toward a projection surface, each pixel of the image can be thought of as a ray that passes through projection coordinate system 1212, is reflected off the projection surface according to the surface coordinate system 1210, and passes through visual coordinate system 1214, where it is visible to the user. When the projection surface is irregular (i.e., not flat), pixel positions, relative one to another, within the image are altered in the visual coordinate system 1214, compared to the relative pixel positions in the projection coordinate system 1212. The altered pixel positions can be defined in terms of a transformation from the projection coordinate system 1212 to the visual coordinate system 1214, through the surface coordinate system 1210. An inverse transformation can then be defined to modify a source image prior to projection, such that the projected image, after being transformed through the surface coordinate system 1210, appears as intended in the visual coordinate system 1214.

FIG. 13 illustrates example transformations between a projection coordinate system 1212 and a visual coordinate system 1214. In the illustrated example, which is based on the example shown in FIG. 12, three transformations between projection coordinate system 1212 and visual coordinate system 1214 are defined. That is, a first transformation applies to those pixels that are projected onto the wall in the area shown with the "A"; a second transformation applies to those pixels that are projected onto the edge of the bookshelf in the area shown with the "B"; and a third transformation applies to those pixels that are projected onto the back surface of the bookshelf in the area shown with the "C". The number of transformations that are defined depends on the projection surface. For a highly irregular surface, more transformations may be defined, each applied to a small number of pixels. If the projection surface is mostly flat, with few areas of irregularity, fewer transformation may be defined, for example, with one of the transformations applying to most of the image pixels.

As illustrated in FIG. 13, for image area "A", a source image pixel projected at location (Xpa, Ypa) in the projection coordinate system 1212 passes through location (Xsa, Ysa, Zsa) in the surface coordinate system 1210, and is visible at location (Xva, Yva) in the visual coordinate system 1214. The transformation from location (Xpa, Ypa) in the projection coordinate system 1212 to location (Xva, Yva) in the visual coordinate system 1214 is given by the transformation T1. Similarly, the transformation from location (Xpb, Ypb) in the projection coordinate system 1212 (a pixel in the "B" area of the image) to a location (Xvb, Yvb) in the visual coordinate system 1214 is given by the transformation T2, and the transformation from location (Xpc, Ypc) in the projection coordinate system 1212 (a pixel in the "C" area of the image) to a location (Xvc, Yvc) in the visual coordinate system 1214 is given by the transformation T3. Inverse transformations T1', T2', and T3' provide for transformations from the visible coordinate system 1214, through the surface coordinate system 1210, to the projection coordinate system 1212.

FIG. 14 illustrates an example source image and a modified source image generated through inverse transformations from a visual coordinate system 1214 to a projection coordinate system 1212. In the illustrated example, source image 1402 is determined to have three distinct areas—area 1404, area 1406, and area 1408. Each area corresponds to a physical characteristic of a projection surface. For example, referring back to FIG. 12, the projection surface includes a first area on a wall, a second area on the front edge of a bookshelf, and a third area on the back surface of a bookcase. Because each of these areas of the projection surface has a different depth, each also affects projected pixels differently, and thus each corresponds to a different transformation function.

Transformations are applied to each pixel in each area of the source image 1402 to generate a modified source image 1410. Transformation T1' is applied to each pixel in area 1404 of the source image, resulting in modified area 1412; transformation T2' is applied to each pixel in area 1406 of the source image, resulting in modified area 1414; transformation T3' is applied to each pixel in area 1408 of the source image, resulting in modified area 1416. In the illustrated example, the source image area that corresponds to the portion of the projection surface that is closest to the projector (area 1406 of source image 1402) undergoes the least amount of transformation. Similarly, the source image area that corresponds to the portion of the projection surface that is furthest from the projector (area 1404 of the source image 1402) undergoes the greatest transformation.

As illustrated and described above with reference to FIG. 12, areas of the source image that are projected onto portions of the projection surface that are a further distance from the projector appear larger than areas of the source image that are projected onto portions of the projection surface that are closer to the projector. In the example illustrated in FIG. 14, the areas of the source image that correspond to portions of the projection surface that are a further distance from the projector (i.e., areas 1404 and 1408) are compressed. As a result, when the image is displayed, those portions of the image appear appropriately sized (i.e., uncompressed).

In an alternate implementation, transformations may be defined such that areas of a source image that correspond to portions of the projection surface that are furthest from the projector remain substantially unchanged, while areas of the source image that correspond to portions of the projection surface that are closer to the projector are expanded. In another alternate implementation, a combination of the two techniques may be used such that portions of the source image that correspond to portions of the projection surface that are of an approximately median depth from the projector remain substantially unchanged, while portions of the source image that correspond to surfaces further from the projector are compressed and portions of the source image that correspond to surfaces closer to the projector are expanded. A choice between various available transformation techniques may depend on a number of factors including, but not limited to, image size, image resolution, distance from the projector to the projection surface, distance between the user and the projection surface, degree of irregularity of the projection surface, and so on.

As shown in FIG. 14, when transformations are applied to different portions of the source image 1402, the resulting modified source image 1410 may appear "incomplete." In other words, gaps may exist between portions of the modified source image (e.g., gaps between area 1412 and area 1414). In an example implementation, the "gaps" will not affect the displayed image because each pixel (in the projection coordinate system) represented in a "gap" does not have a corresponding pixel, after transformation, in the visible coordinate system. Accordingly, these pixels may be left blank, or may be filled in with any color (e.g., black or white).

In addition to gaps, transformations of source images may also result in transformed portions that overlap (e.g., overlap of areas 1414 and 1416). When two portions of a modified source image overlap, various techniques may be used to determine a color value for the overlapping pixels. In one implementation, a first-assigned value may be used. For example, as the source image is transformed, once a pixel in the modified source image is assigned a color value, the color value of the pixel remains, even if a later transformation of another area of the source image results in a different color value for the same pixel.

In another implementation, a last-assigned value may be used. For example, as the source image is transformed, each time a color value is determined for a particular pixel in the modified source image, the color value for the pixel is assigned, even if the pixel was previously assigned a different color value. In another implementation, if a multiple color values are determined for a single pixel, the multiple color values are blended to determine a value for the pixel in the modified source image. In another implementation, temporal multiplexing may be applied to any pixels in the modified source image for which two or more color values are determined through the transformation process.

FIG. 15 shows an illustrative augmented reality environment 1500 in which a source image is modified to account for image distortion based on distances between the projection surface and the projector and based on a difference between a projection angle 1502 and a viewing angle 1504.

In the example of FIG. 15, an image may be projected toward a wall 1506 against which a cabinet 1508 has been placed. Because the angle of projection 1502 is different from the viewing angle 1504 of the user 1510 and because the projection surface is not uniformly flat in relation to the projector, the displayed image will appear distorted to the user 1510. To adjust for the distortion in the projected image, a source image 1512 is transformed into a modified source image which, when projected, results in a projected image 1514 that, from the user's perspective, substantially resembles the source image 1512.

FIG. 16 illustrates example coordinate systems to support the transformation from a source image to a modified source image based on a difference between a projection angle and a viewing angle. For example, coordinate system 1602 represents pixels projected onto a surface as viewed by a user. Coordinate system 1604 represents a viewing area of the user into which an image is to be projected.

The transformation 1606 of a source image may be performed in a variety of ways. In a first example, for each pixel in the projection coordinate system 1602, a determination is made as to whether or not a pixel in the viewable coordinate system 1604 intersects the same area. In an alternate example, for each pixel in the viewable coordinate system 1604, a determination is made as to whether or not a pixel in the projection coordinate system 1602 intersects the same area.

FIG. 17 illustrates an example source image, corresponding modified source image, and resulting projected image from multiple perspectives. In the illustrated example, the source image 1512 is transformed to generate a modified source image 1702. The cross-hatched areas of the modified source image 1702 represent areas that are blank—that is, area of the projection area that do not correspond to areas of the viewing area of the user.

As described above with reference to FIG. 15, the projector and the viewer are at different angles to the projection surface. The projector point of view 1704 illustrates how the modified source image 1702 appears, when projected, from the point of view of the projector. Because the user and the projector have different viewing angles, the modified source image 1702 appears differently to the user, as indicated in FIG. 17 by the user point of view 1706.

Figure 18:
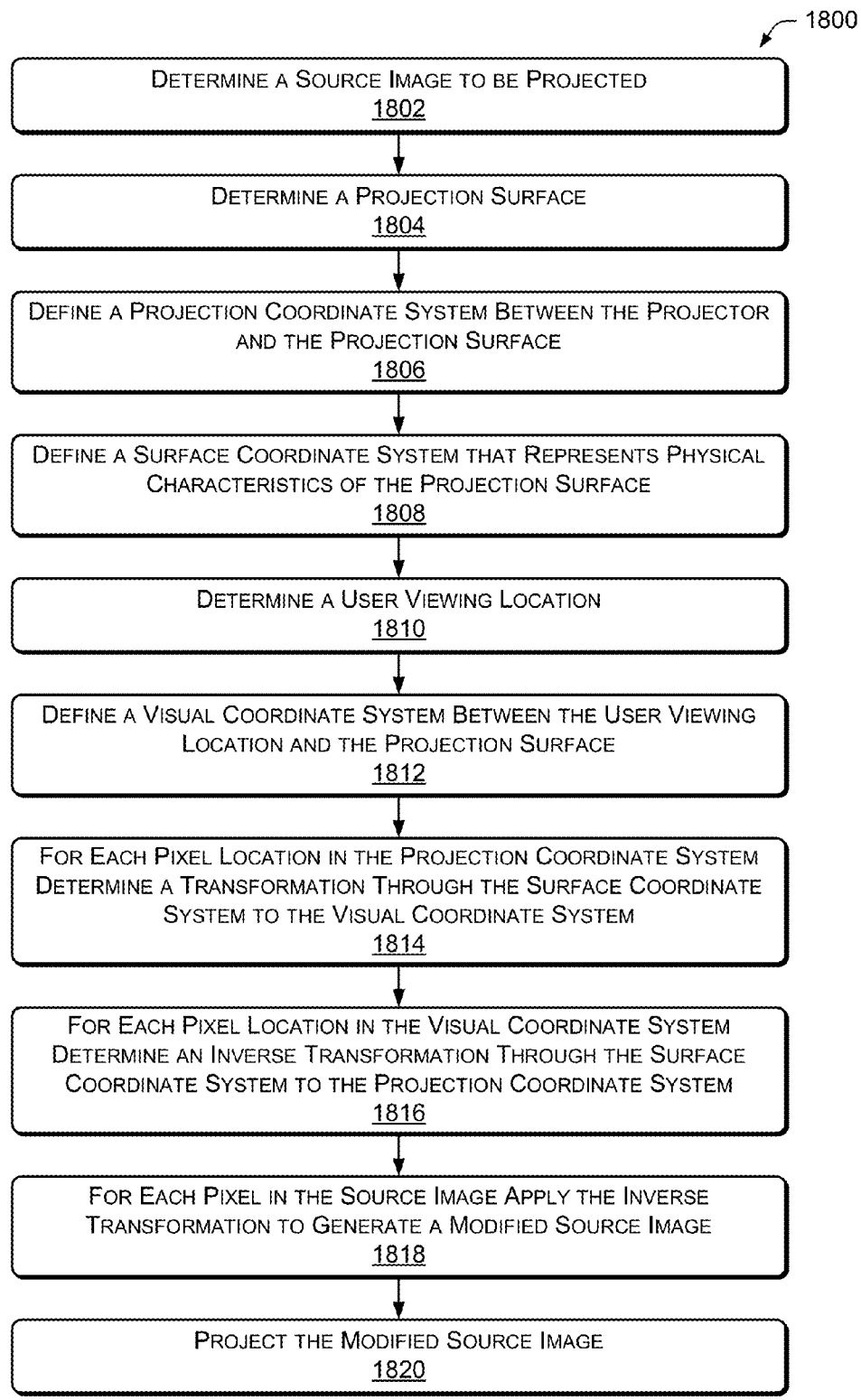
FIG. 18 shows an illustrative process of transforming a source image to a modified source image based on a difference between a projection angle and a viewing angle and based on physical characteristics of a projection surface.

FIG. 18 illustrates an example process 1800 for generating a modified source image based on physical characteristics of a projection surface and/or differences between a projection angle and a viewing angle.

At 1802, a source image to be projected is determined. For example, computing device 120 receives an image to be projected into an augmented reality environment 100.

At 1804, a projection surface is determined. For example, based on a current position of the projector 206, camera 210 determines a surface onto which an image projected from the projector 206 will be displayed.

At 1806, a projection coordinate system is defined between the projector and the projection surface. For example, the spatial analysis module 132 defines a two-dimensional projection coordinate system in line with the current position of the projector 206, the projection coordinate system being a representation of the projector field of view 208. Depending on the angle of the projection in relation to the projection surface, and the viewing angle of the user in relation to the projection surface, the projection coordinate system may not appear to the user to be uniformly rectangular in shape.

At 1808, a surface coordinate system is defined to represent physical characteristics of the projection surface. For example, spatial analysis module 132 may analyze data from depth camera 210 to determine a topology of the projection surface and to generate a three-dimensional surface coordinate system that represents the topology of the projection surface.

At 1810, a user viewing location is determined. For example, the user identification and authentication module 140 may determine a user's location within the environment and to detect at least an approximate location of the user's eyes.

At 1812, a visual coordinate system is defined between the user viewing location and the projection surface. For example, the spatial analysis module 132 defines a two-dimensional visual coordinate system that is in line with the determined user view location. The visual coordinate system is defined to represent a desired field of view of the user.

At 1814, for each pixel location in the projection coordinate system, a transformation is determined through the surface coordinate system to the visual coordinate system. For example as described above with reference to FIG. 12 and FIG. 16, based on a non-uniform projection surface or a difference between the projection angle and viewing angle, pixel locations in the projection coordinate system may not map directly to coordinating pixel locations in the visual coordinate system. The coordinate transformation module 148 determines a mathematical transformation from the projection coordinate system to the visual coordinate system, accounting for the angle differences and the physical characteristics of the projection surface, which are represented in the surface coordinate system.

At 1816, for each pixel location in the visual coordinate system, an inverse transformation is determined through the surface coordinate system to the projection coordinate system. For example, the coordinate transformation module 148 calculates inverse transformations from the transformations determined as described above with reference to 1514.

At 1818, for each pixel in the source image, the corresponding inverse transformation is applied to generate a modified source image. For example, given a pixel location in the source image, the coordinate transformation module 148 applies the inverse transformation associated with the same location in the visual coordinate system, thereby modifying the location of the source image pixel. The source image pixel is stored to the new location in a modified source image.

At 1820, the modified source image is projected. For example, the computing device 120 sends the modified source image to the projector 206 for projection toward the projection surface.

In an example implementation, while the modified source image is being projected, the spatial analysis module 132 monitors the projection surface for changes. For example, if the projection surface is a wall over which a curtain hangs, the position of the curtain may change (e.g., due to a breeze or due to a person opening or closing the curtain) while the modified source image is being projected. In this implementation, if the spatial analysis module 132 detects a significant change in the topology of the projection surface, the processing described above with reference to blocks 1808 and 1814-1820 may be repeated to account for the changes in the topology of the projection surface.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. A system comprising:
  a processor;
  a memory;
  a spatial analysis module comprising computer-executable instructions stored in the memory and executed on the processor to determine a physical topology of a projection surface onto which a source image is to be displayed;
  a user identification module comprising computer-executable instructions stored in the memory and executed on the processor to determine a view direction of a user; and
  a coordinate transformation module comprising computer-executable instructions stored in the memory and executed on the processor to generate a modified source image based at least in part on the source image, the physical topology of the projection surface, and on the determined view direction.

2. The system as recited in claim 1, further comprising a camera for capturing images of the projection surface, wherein the spatial analysis module is configured to determine the physical topology of the projection surface based at least in part on the captured images.

3. The system as recited in claim 1, wherein the coordinate transformation module is configured to:
  generate a three-dimensional coordinate system to represent the physical topology of the projection surface; and
  transform a two-dimensional representation of the source image to a two-dimensional representation of the modified source image based at least in part on the three-dimensional coordinate system.

4. The system as recited in claim 1,
  wherein the user identification module is configured to determine the view direction of the user based at least in part on a location of the user's eyes.

5. The system as recited in claim 4, further comprising a camera to capture images of the user within an environment, wherein the user identification module is configured to determine the view direction of the user based at least in part on the images of the user captured by the camera.

6. A method comprising:
  under control of one or more computer systems configured with executable instructions,
  determining a physical topology of a projection surface onto which a source image is to be displayed;
  determining a view direction of a user; and
  generating a modified source image based at least in part on the source image, the physical topology of the projection surface, and on the determined view direction.

7. The method as recited in claim 6, wherein the modified source image comprises a first area of one or more pixels that are compressed as compared to a corresponding area in the source image.

8. The method as recited in claim 6, wherein the modified source image comprises a first area of one or more pixels that are expanded as compared to a corresponding area in the source image.

9. The method as recited in claim 8, wherein the modified source image comprises a second area of one or more pixels that are compressed as compared to a corresponding area in the source image.

10. The method as recited in claim 6, wherein the projection surface comprises:
  a first area that is a first distance from a projector; and
  a second area that is a second, different distance from the projector.

11. The method as recited in claim 6, further comprises:
  defining a projection coordinate system through which an image passes when projected from a projector toward the projection surface;
  defining a surface coordinate system that represents the physical topography of the projection surface;
  defining a visual coordinate system using the view direction of the user;
  wherein generating the modified source image comprises:
    defining a transformation from the visual coordinate system using the view direction of the user through the surface coordinate system that represents the topography of the projection surface to the projection coordinate through which the image passes when projected from the projector toward the projection surface; and
  projecting the modified source image onto the projection surface.

12. The method as recited in claim 11, wherein the projection coordinate system is a two-dimensional coordinate system.

13. The method as recited in claim 11, wherein the visual coordinate system is a two-dimensional coordinate system.

14. The method as recited in claim 11, wherein the projection coordinate system has a first angle relative to the projection surface and the visual coordinate system has a second angle, different from the first angle, relative to the projection surface.

15. The method as recited in claim 11, wherein defining a transformation from the visual coordinate system through the surface coordinate system to the projection coordinate system comprises:
  defining a first transformation from the projection coordinate system through the surface coordinate system to the visual coordinate system; and
  defining the transformation from the visual coordinate system through the surface coordinate system to the projection coordinate system as an inverse of the first transformation.

16. The method as recited in claim 11, wherein defining the transformation from the visual coordinate system through the surface coordinate system to the projection coordinate system comprises:
  defining a first transformation for a first set of one or more pixels within an area of the original source image that corresponds to a first area of the projection surface that is a first distance from the projector; and
  defining a second transformation for a second set of one or more pixels within an area of the original source image that corresponds to the second area of the projection surface that is a second distance from the projector.

\* \* \* \* \*